United States Patent
Dong et al.

(10) Patent No.: US 12,231,162 B2
(45) Date of Patent: Feb. 18, 2025

(54) FAULT LOCATING METHOD, APPARATUS, AND SYSTEM

(71) Applicant: HUAWEI TECHNOLOGIES CO., LTD., Shenzhen (CN)

(72) Inventors: Zhenhua Dong, Dongguan (CN); Xiaolong Dong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

(21) Appl. No.: 17/976,558

(22) Filed: Oct. 28, 2022

(65) Prior Publication Data

US 2023/0052962 A1 Feb. 16, 2023

Related U.S. Application Data

(63) Continuation of application No. PCT/CN2020/132534, filed on Nov. 28, 2020.

(30) Foreign Application Priority Data

Apr. 29, 2020 (CN) .......................... 202010357617.4

(51) Int. Cl.
*H04B 10/071* (2013.01)
*H04B 10/077* (2013.01)
*H04B 10/61* (2013.01)

(52) U.S. Cl.
CPC ....... *H04B 10/071* (2013.01); *H04B 10/0771* (2013.01); *H04B 10/0773* (2013.01); *H04B 10/614* (2013.01)

(58) Field of Classification Search
CPC .............. H04B 10/071; H04B 10/0771; H04B 10/0773; H04B 10/614; H04B 10/272;
(Continued)

(56) References Cited

U.S. PATENT DOCUMENTS

| | | | | |
|---|---|---|---|---|
| 2009/0190921 A1* | 7/2009 | Nakajima | .......... | G01M 11/3136 398/21 |
| 2011/0013904 A1* | 1/2011 | Khermosh | ........... | H04B 10/071 398/16 |

(Continued)

FOREIGN PATENT DOCUMENTS

| | | | | |
|---|---|---|---|---|
| CN | 101688819 A | * | 3/2010 | ........ G01M 11/3163 |
| CN | 111669221 A | | 9/2020 | |

(Continued)

OTHER PUBLICATIONS

Temporao et al., "Fault Location in Passive Optical Networks Using T-OTDR and Wavelength-Selective Isolators," 2013 Optical Fiber Communication Conference and Exposition and the National Fiber Optic Engineers Conference (OFC/NFOEC), IEEE, Total 3 pages (Mar. 2013).

*Primary Examiner* — Abbas H Alagheband
(74) *Attorney, Agent, or Firm* — Leydig, Voit & Mayer, Ltd.

(57) ABSTRACT

This application relates to the field of fiber-optic communication technologies, and provides a fault locating method, apparatus, and system. The method includes: obtaining a first correspondence between a receive time and receive power during reverse backhaul that occurs when a test optical signal that can be reflected by a reflection component disposed at each port of at least one stage of optical splitter is in downlink transmission in an ODN, where reverse backhaul includes backscatter and reflection or includes backscatter; determining, based on the first correspondence, a second correspondence between a transmission distance and receive power during reverse backhaul that occurs when a test optical signal is in downlink transmission in an optical fiber between each port of the at least one stage of optical (Continued)

splitter and a component connected to the port; and locating a fault in the ODN based on the second correspondence.

18 Claims, 6 Drawing Sheets

(58) Field of Classification Search
CPC ....... H04Q 11/0067; H04Q 2011/0083; H04Q 11/0062
USPC ............................................................ 398/1
See application file for complete search history.

(56) References Cited

U.S. PATENT DOCUMENTS

| | | | |
|---|---|---|---|
| 2012/0163800 A1* | 6/2012 | Urban .................. | H04B 10/071 398/12 |
| 2014/0126900 A1* | 5/2014 | Urban ................ | H04B 10/0771 398/13 |
| 2014/0133847 A1* | 5/2014 | Vall-Llosera ....... | H04J 14/0247 398/21 |
| 2016/0033359 A1* | 2/2016 | Gurusami .......... | G01M 11/3109 356/73.1 |

FOREIGN PATENT DOCUMENTS

| | | | | |
|---|---|---|---|---|
| CN | 115579725 A | * | 1/2023 | |
| JP | 2007064931 A | | 3/2007 | |
| JP | 2007205967 A | | 8/2007 | |
| JP | 2012173184 A | | 9/2012 | |
| KR | 101657329 B1 | * | 9/2016 | ........... H04B 10/071 |

* cited by examiner

FAULT LOCATING METHOD, APPARATUS, AND SYSTEM

CROSS-REFERENCE TO RELATED APPLICATIONS

This application is a continuation application of International Application No. PCT/CN2020/132534, filed on Nov. 28, 2020, which claims priority to Chinese Patent Application No. 202010357617.4, filed on Apr. 29, 2020. The disclosures of the aforementioned applications are hereby incorporated by reference in their entireties.

TECHNICAL FIELD

Embodiments of this application relate to the fiber-optic communication field, and in particular, to a fault locating method, apparatus, and system.

BACKGROUND

A passive optical network system includes an optical line terminal (OLT), an optical distribution network (ODN), and a plurality of optical access network user terminals. The optical access network user terminal adopts an optical network unit (ONU) or an optical network terminal (ONT). The ODN may be divided into an optical splitter, a feeder optical fiber, a distribution optical fiber (existing in a plurality of stages of optical splitters), and a drop optical fiber. The feeder optical fiber is an optical fiber between the OLT and the ODN, the distribution optical fiber is an optical fiber between optical splitters at various stages, and the drop optical fiber is an optical fiber between the optical splitter and the optical access network user terminal. An explosive increase in a quantity of constructed passive optical network systems causes a shortage of a maintenance engineer, a heavy workload, a lack of a maintenance means, and a difficulty in accurately locating a fault point. The difficulty of fault locating mainly exists in the ODN, and a main reason is a large quantity of ODNs. As a result, the network is complex, and it is relatively difficult to quickly locate a fault.

In a related technology, an optical time domain reflectometer (OTDR) is deployed at a central office end (an OLT side). The OTDR emits an optical signal for downlink transmission. When the optical signal is transmitted in an optical fiber, a part of the optical signal is reflected and backscattered, to return to the OTDR through reverse backhaul and be detected by the OTDR. The OTDR establishes a correspondence between a transmission distance and receive power by using receive power of a received optical signal and a receive time of receiving the optical signal. Receive power at a transmission distance is superposed power of optical signals backscattered by all distribution optical fibers and drop optical fibers at the transmission distance in the ODN, or superposed power of optical signals reflected and backscattered by all distribution optical fibers and drop optical fibers at the transmission distance (the optical fiber reflects the optical signal at a broken location of the optical fiber). The OTDR may determine, based on the correspondence, a location point at which receive power suddenly changes; and may determine, based on the location point, whether an optical fiber in the ODN is faulty.

After the optical splitter is used, receive power at a transmission distance is superposed power of optical signals backscattered by all distribution optical fibers and drop optical fibers at the transmission distance in the ODN, or superposed power of optical signals reflected and backscattered by all distribution optical fibers and drop optical fibers at the transmission distance. Therefore, even if a location point at which receive power suddenly changes is obtained, a faulty distribution optical fiber and a faulty drop optical fiber cannot be determined.

SUMMARY

Embodiments of this application provide a fault locating method, apparatus, and system. This application may be used to accurately locate a fault in an ODN.

According to a first aspect, a fault locating method is provided, and is applied to a passive optical network. The passive optical network includes an ODN, and a reflection component reflecting test optical signals of different wavelengths is disposed at each port of at least one stage of optical splitter in the ODN. The method includes: obtaining a first correspondence between a receive time and receive power during reverse backhaul that occurs when a test optical signal that can be reflected by the reflection component disposed at each port of the at least one stage of optical splitter is in downlink transmission in the ODN, where reverse backhaul includes backscatter and reflection or includes backscatter; determining, based on the first correspondence, a second correspondence between a transmission distance and receive power during reverse backhaul that occurs when a test optical signal is in downlink transmission in an optical fiber between each port of the at least one stage of optical splitter and a component connected to the port; and locating a fault in the ODN based on the second correspondence.

In the solution shown in this application, an apparatus for locating a fault may be an OTDR with a tunable wavelength. When a fault is located in the ODN, a fault locating instruction may be sent to the OTDR (for example, an OLT sends the fault locating instruction). When the OTDR receives the fault locating instruction, the OTDR may sequentially send test optical signals of wavelengths that can be reflected by the reflection component at each port of the at least one stage of optical splitter, and record sending times. When a test optical signal of any wavelength in these wavelengths passes through the ODN, a reflection component at a port that is corresponding to the wavelength and that is of the at least one stage of optical splitter in the ODN reflects (basically totally reflects) the test optical signal of the wavelength. However, the test optical signal of the wavelength is completely transmitted when passing through another port in the ODN. It may be learned that the test optical signal of the wavelength is reflected and backscattered by only various optical fibers and a specific reflection component in the ODN (the optical fiber reflects the test optical signal when being broken), so that a part of the test optical signal of the wavelength returns to the OTDR through reverse backhaul and is received by the OTDR. The OTDR may record a correspondence between a receive time and receive power. In this way, a first correspondence between a receive time and receive power during reverse backhaul that occurs when a test optical signal that can be reflected by a reflection component corresponding to the wavelength is in downlink transmission in the ODN is obtained. The OTDR may determine, by using each first correspondence, a second correspondence between a transmission distance and receive power during reverse backhaul that occurs when a test optical signal is in downlink transmission in an optical fiber between each port of the at least one stage of optical splitter and a component connected to the port. The OTDR may determine, based on each second correspondence, whether a fault exists in the ODN, and determine a fault location point. In this way, because an optical fiber between a port of the optical splitter and a component connected to the port is corresponding to the second correspondence, it may be accurately determined, by using the second correspondence, whether a fault exists in an optical fiber (a drop optical fiber, a feeder optical fiber, and a distribution optical fiber) in the ODN, and a location at which the fault occurs.

In a possible implementation, the at least one stage of optical splitter is a first-stage optical splitter. The determining, based on the first correspondence, a second correspondence between a transmission distance and receive power during reverse backhaul that occurs when a test optical signal is in downlink transmission in an optical fiber between each port of the at least one stage of optical splitter and a component connected to the port includes: obtaining a third correspondence between a transmission distance in the ODN and superposed receive power of all optical fibers in the ODN: converting each first correspondence into a fourth correspondence between a transmission distance and receive power during reverse backhaul; and performing subtraction between receive power at a same transmission distance in the third correspondence and each fourth correspondence, to obtain a second correspondence between a transmission distance and receive power during reverse backhaul that occurs when a test optical signal is in downlink transmission in an optical fiber between each port of the first-stage optical splitter and a component connected to the port of the first-stage optical splitter.

In the solution shown in this application, the OTDR may obtain the third correspondence. In the third correspondence, superposed receive power corresponding to each transmission distance is superposition of power of optical signals reflected and backscattered by all optical fibers at the transmission distance, or superposition of power of optical signals backscattered by all optical fibers at the transmission distance. For a first correspondence between a receive time and receive power during reverse backhaul that occurs when a test optical signal that can be reflected by a reflection component disposed at a first port of the first-stage optical splitter (the first port is any port of the first-stage optical splitter) is in downlink transmission in the ODN, the OTDR may determine, by using an emitting time of the test optical signal and the receive time in the first correspondence, a transmission distance corresponding to each receive time in the first correspondence. Then, the OTDR makes a correspondence between the transmission distance corresponding to each receive time and the receive power, to obtain a fourth correspondence between the transmission distance and the receive power. The OTDR may separately perform subtraction between receive power at a same transmission distance in the third correspondence and the fourth correspondence, to obtain a difference of receive power corresponding to each transmission distance in the fourth correspondence. The OTDR determines that a correspondence between the transmission distance and the difference of the receive power is a second correspondence between a transmission distance and receive power during reverse backhaul that occurs when a test optical signal is in downlink transmission in an optical fiber between the first port and a component connected to the first port. In this way, the second correspondence may be accurately determined.

In a possible implementation, the at least one stage of optical splitter includes a first-stage optical splitter and a second-stage optical splitter. The determining, based on the first correspondence, a second correspondence between a transmission distance and receive power during reverse backhaul that occurs when a test optical signal is in downlink transmission in an optical fiber between each port of the at least one stage of optical splitter and a component connected to the port includes: obtaining a third correspondence between a transmission distance in the ODN and superposed receive power of all optical fibers in the ODN; determining, based on the third correspondence and a first correspondence between a receive time and receive power during reverse backhaul that occurs when a test optical signal that can be reflected by a reflection component disposed at each port of the second-stage optical splitter is in downlink transmission in the ODN, a second correspondence between a transmission distance and receive power during reverse backhaul that occurs when a test optical signal is in downlink transmission in an optical fiber between each port of the second-stage optical splitter and a component connected to the port of the second-stage optical splitter; and determining, based on each first correspondence and each second correspondence, a second correspondence between a transmission distance and receive power during reverse backhaul that occurs when a test optical signal is in downlink transmission in an optical fiber between each port of the first-stage optical splitter and a component connected to the port of the first-stage optical splitter.

In the solution shown in this application, the OTDR may obtain the third correspondence. In the third correspondence, superposed receive power corresponding to each transmission distance is superposition of power of optical signals reflected and backscattered by all optical fibers at the transmission distance, or superposition of power of optical signals backscattered by all optical fibers at the transmission distance.

For a first correspondence between a receive time and receive power during reverse backhaul that occurs when a test optical signal that can be reflected by a reflection component disposed at a second port of the second-stage optical splitter (the second port is any port of the second-stage optical splitter) is in downlink transmission in the ODN, the OTDR may determine, by using an emitting time of the test optical signal and the receive time in the first correspondence, a transmission distance corresponding to each receive time in the first correspondence. Then, the OTDR makes a correspondence between the transmission distance corresponding to each receive time and the receive power, to obtain a fourth correspondence between the transmission distance and the receive power. The OTDR may separately perform subtraction between receive power at a same transmission distance in the third correspondence and the fourth correspondence, to obtain a difference of receive power corresponding to each transmission distance in the fourth correspondence. The OTDR determines that a correspondence between the transmission distance and the difference of the receive power is a second correspondence between a transmission distance and receive power during reverse backhaul that occurs when a test optical signal is in downlink transmission in an optical fiber between the second port and a component connected to the second port.

The OTDR may determine, by using each first correspondence and a second correspondence between a transmission distance and receive power during reverse backhaul that occurs when a test optical signal is in downlink transmission in an optical fiber between each port of the second-stage optical splitter connected to a first port (the first port is any port of the first-stage optical splitter) and a component connected to the port of the second-stage optical splitter, a second correspondence between a transmission distance and receive power during reverse backhaul that occurs when a test optical signal is in downlink transmission in an optical fiber between the first port and a component connected to the first port. In this way, the second correspondence may be accurately determined.

In a possible implementation, the obtaining a third correspondence between a transmission distance in the ODN and superposed receive power of all optical fibers in the ODN includes: obtaining a correspondence between a transmission distance and receive power during reverse backhaul that occurs when a test optical signal of a first wavelength is in downlink transmission in the ODN, and determining the correspondence as the third correspondence between a transmission distance in the ODN and superposed receive power of all optical fibers in the ODN, where the first wavelength is different from a wavelength of a test optical signal that can be reflected by the reflection component at each port of the at least one stage of optical splitter: or determining the third correspondence between a transmission distance in the ODN and superposed receive power of all optical fibers in the ODN based on a first correspondence between a receive time and receive power during reverse backhaul that occurs when a test optical signal that can be reflected by a reflection component disposed at each port of the first-stage optical splitter is in downlink transmission in the ODN.

In the solution shown in this application, the OTDR may send the test optical signal of the first wavelength, and record a sending time of sending the test optical signal of the first wavelength. When the test optical signal of the first wavelength passes through the ODN, all the reflection components disposed at the ports of the at least one stage of optical splitter in the ODN transmit the test optical signal of the first wavelength, and only various optical fibers and optical splitters in the ODN reflect and backscatter or backscatter the test optical signal of the first wavelength, so that a part of the test optical signal of the first wavelength returns to the OTDR and is received by the OTDR. The OTDR may record a correspondence between a receive time and receive power, and then determine a transmission distance by using a difference between the receive time and a sending time, to obtain a correspondence between a transmission distance and receive power, that is, obtain the third correspondence.

Alternatively, after obtaining the first correspondence between a receive time and receive power during reverse backhaul that occurs when the test optical signal that can be reflected by the reflection component disposed at each port of the at least one stage of optical splitter is in downlink transmission in the ODN, the OTDR may convert, into a correspondence between a transmission distance and receive power, the first correspondence between a receive time and receive power during reverse backhaul that occurs when the test optical signal that can be reflected by the reflection component disposed at each port of the first-stage optical splitter is in downlink transmission in the ODN. Afterwards, the OTDR adds up receive power at a same transmission distance in these correspondences to obtain a value, and then divides (m−1) by the value to obtain receive power at the same transmission distance, where m is a quantity of ports of the first-stage optical splitter. In this manner, receive power at each transmission distance is determined, and a correspondence may be made between the transmission distance and the receive power to obtain the third correspondence. In this way, because the test optical signal of the first wavelength does not need to be sent, a wavelength adjustment range of the OTDR may be reduced.

In a possible implementation, the locating a fault in the ODN based on the second correspondence includes: if it is determined, based on a second correspondence between a transmission distance and receive power during reverse backhaul that occurs when a test optical signal is in downlink transmission in an optical fiber between a target port of the at least one stage of optical splitter and a component connected to the target port, that an abnormal location point at which receive power suddenly changes exists, determining the abnormal location point as a fault location point of the optical fiber between the target port and the component connected to the target port.

In the solution shown in this application, the OTDR may view; in each second correspondence, whether an abnormal location point at which receive power suddenly changes exists. If an abnormal location point exists in the second correspondence between a transmission distance and receive power during reverse backhaul that occurs when a test optical signal is in downlink transmission in the optical fiber between the target port of the at least one stage of optical splitter and the component connected to the target port, the abnormal location point may be determined as the fault location point of the optical fiber between the target port and the component connected to the target port. In this way, not only a faulty optical fiber in the ODN is provided, but also a location point at which the optical fiber is faulty is provided.

According to a second aspect, a fault locating system is provided and is applied to a passive optical network, where the system includes an optical time domain reflectometer OTDR.

The OTDR is configured to output test optical signals of a plurality of wavelengths.

The OTDR is further configured to perform the method according to the first aspect.

According to a third aspect, a fault locating system is provided and is applied to a passive optical network, where the system includes an optical time domain reflectometer OTDR and an optical line terminal OLT.

The OTDR is configured to output test optical signals of a plurality of wavelengths.

The OTDR is further configured to detect receive power and a receive time of a received test optical signal.

The OLT establishes a communication connection to the OTDR.

The OLT is configured to perform the method according to the first aspect.

According to a fourth aspect, a fault locating apparatus is provided, where the apparatus includes a plurality of modules, and the plurality of modules execute instructions to implement the fault locating method according to the first aspect.

According to a fifth aspect, a fault locating device is provided, where the fault locating device includes a processor and a memory.

The memory stores computer instructions.

The processor executes the computer instructions to implement the method according to the first aspect.

According to a sixth aspect, a computer-readable storage medium is provided, where the computer-readable storage medium stores computer instructions. When the computer instructions in the computer-readable storage medium are executed by a fault locating device, the fault locating device is enabled to perform the method according to the first aspect.

According to a seventh aspect, this application provides a computer program product, where the computer program product includes computer instructions. When the computer instructions are executed by a fault locating device, the fault locating device performs the fault locating method according to the first aspect.

DESCRIPTION OF EMBODIMENTS

To make objectives, technical solutions, and advantages of this application clearer, the following further describes implementations of this application in detail with reference to the accompanying drawings.

Figure 1:
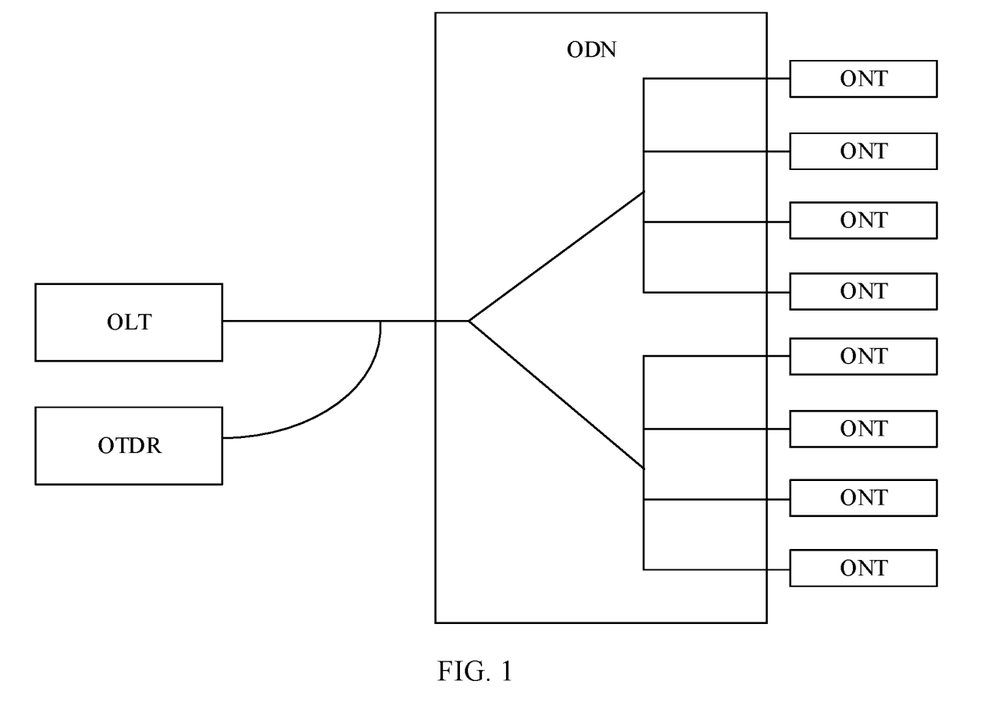
FIG. 1 is a schematic diagram of an application scenario according to an example embodiment of this application.

This application is applicable to a PON system. As shown in FIG. 1, a structure of the PON system includes three parts: an OLT, an ODN, and an optical access network user terminal (such as an ONT). The ODN is usually divided into four parts: an optical splitter, a feeder optical fiber, a distribution optical fiber, and a drop optical fiber. The feeder optical fiber is an optical fiber between the OLT and the ODN, the distribution optical fiber is an optical fiber between optical splitters at various stages, and the drop optical fiber is an optical fiber between the optical splitter and the optical access network user terminal. FIG. 1 is a diagram of a structure of an ODN with two-stage optical splitting. An ODN with only one-stage optical splitting only has a feeder optical fiber and a drop optical fiber.

Because the ODN includes a passive component, it is difficult to identify an optical fiber fault in the ODN. Therefore, this application provides a fault locating method. To locate a fault in an ODN, a reflection component reflecting test optical signals of different wavelengths is disposed at each port of at least one stage of optical splitter in the ODN. Reflectivity of the reflection component disposed at each port is greater than or equal to a preset value. Generally, the preset value is relatively large, for example, the preset value is 99% or 98%. For example, the at least one stage of optical splitter includes a first-stage optical splitter, the first-stage optical splitter is a 1*4 optical splitter, and a reflection component reflecting test optical signals of different wavelengths is disposed at each of four ports. The reflection component may be a reflection grating, or may be another component. This is not limited in this embodiment of this application.

Figure 2:
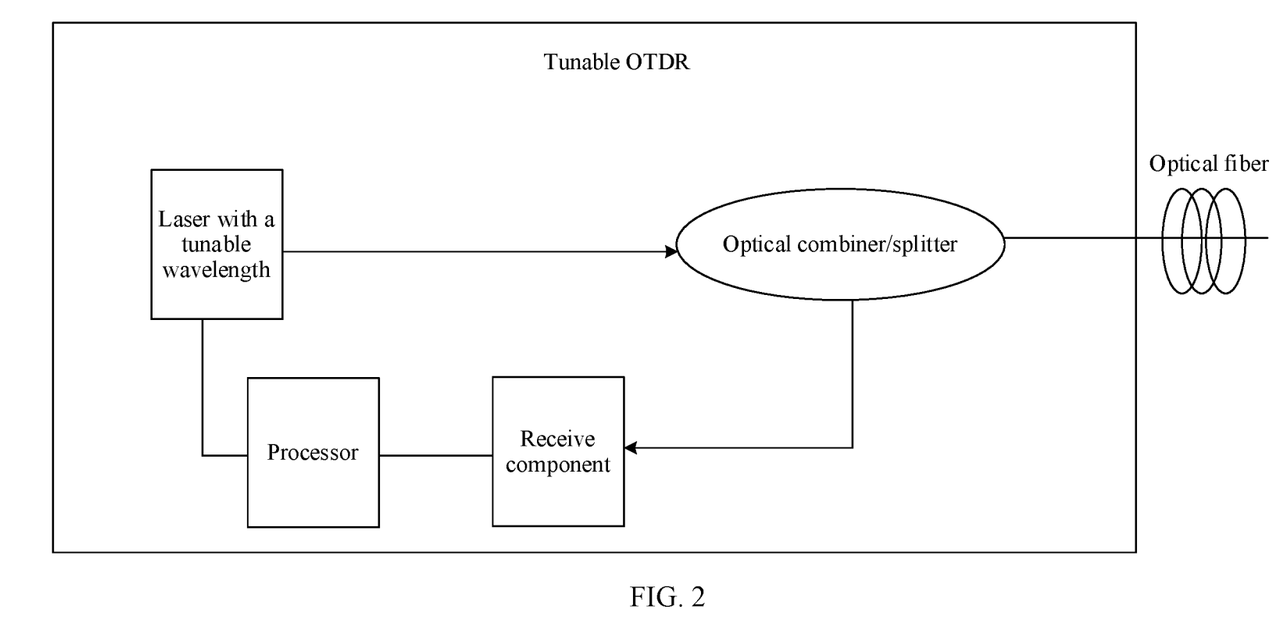
FIG. 2 is a schematic diagram of a structure of a tunable OTDR according to an example embodiment of this application.

In addition, the PON system further includes an OTDR, where the OTDR is a tunable OTDR. In this embodiment of this application, the tunable OTDR is an OTDR with a tunable wavelength. The tunable OTDR means that an OTDR is enabled, based on the original OTDR, to send test optical signals of a plurality of wavelengths. The plurality of wavelengths include a wavelength of a test optical signal that can be reflected by the reflection component disposed at each port of the at least one stage of optical splitter. The tunable OTDR may further detect receive power and a receive time of a received test optical signal. The receive power exists herein because the test optical signal is backscattered to the tunable OTDR when being transmitted in the optical fiber, and the test optical signal is reflected back to the tunable OTDR when the optical fiber is broken, or because the reflection component disposed at the port of the optical splitter reflects the test optical signal back to the tunable OTDR. When the fault locating method is performed by the tunable OTDR, the tunable OTDR may further locate a fault. As shown in FIG. 2, a schematic diagram of a tunable OTDR is further provided. The tunable OTDR includes a laser with a tunable wavelength, an optical combiner/splitter (such as a coupler) or a circulator, a receive component, a processor, and the like. The laser with a tunable wavelength is configured to output test optical signals of a plurality of wavelengths. The optical combiner/splitter or the circulator is configured to send a test optical signal and receive a test optical signal. The receive component is configured to detect receive power, and the processor is configured to record a receive time, and so on. FIG. 2 shows only some components.

It should be noted herein that, if both a service optical signal and a test optical signal exist, a component, such as a wavelength division multiplexer, configured to combine the service optical signal and the test optical signal may be further disposed between the tunable OTDR and an ODN. In this case, the component is also used when the service optical signal is sent between an OLT and the ODN.

The fault locating method may be performed by a fault locating device, and the fault locating device may be an OLT or a tunable OTDR. Specifically, when being performed by the OLT, the fault locating method may be performed by a board in the OLT. Certainly, the fault locating device may be another device, such as a terminal or a server.

Figure 3:
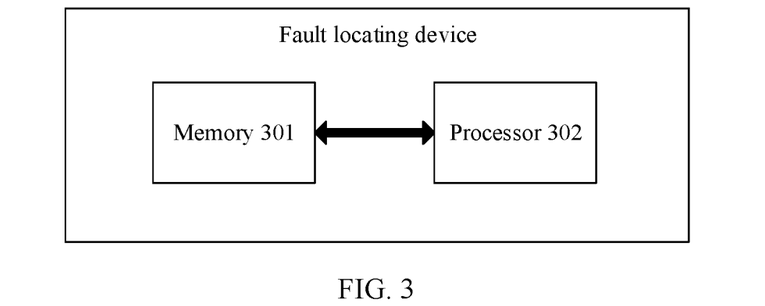
FIG. 3 is a schematic diagram of a structure of a fault locating device according to an example embodiment of this application.

As shown in FIG. 3, the fault locating device includes a memory 301 and a processor 302. The memory 301 may be a read-only memory (ROM), a static storage device, a dynamic storage device, or the like. The memory 301 may store computer instructions. When the computer instructions stored in the memory 301 are executed by the processor 302, the processor 302 is configured to perform the fault locating method. The memory may further store data. The processor 302 may be a general-purpose central processing unit (CPU), an ASIC, a graphics processing unit (GPU), or any combination thereof. The processor 302 may include one or more chips.

Figure 4:
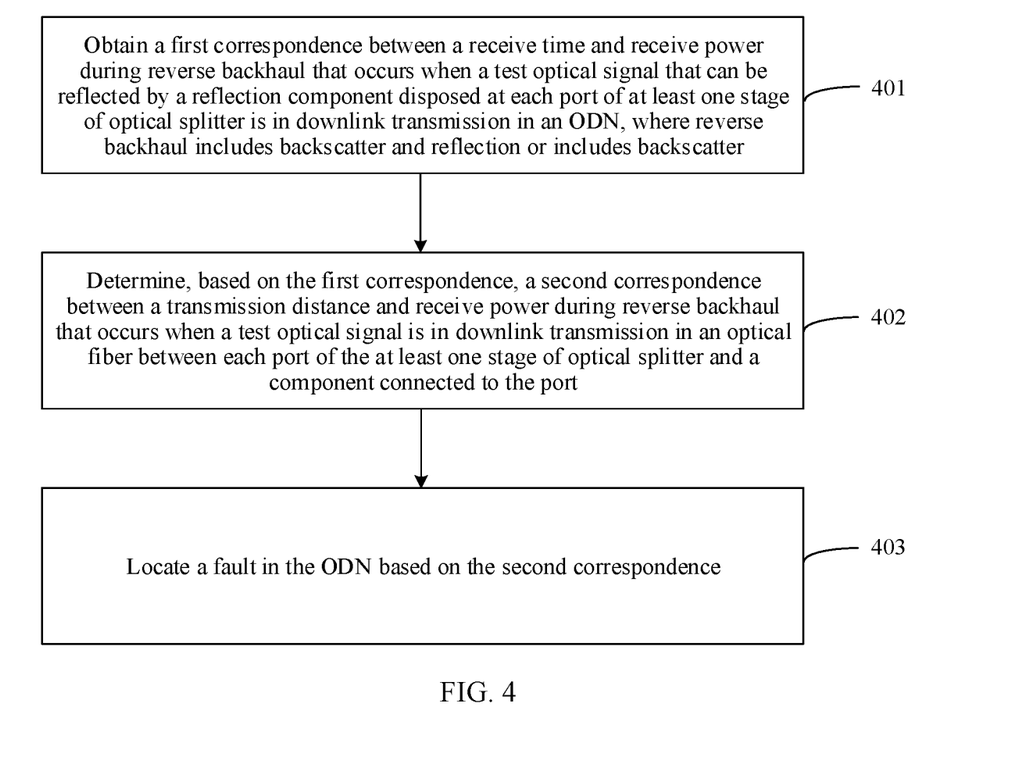
FIG. 4 is a schematic diagram of a procedure of a fault locating method according to an example embodiment of this application.

As shown in FIG. 4, an execution procedure of a fault locating method is provided. This procedure is described by using an example in which a fault locating apparatus is an OTDR with a tunable wavelength.

Step 401: Obtain a first correspondence between a receive time and receive power during reverse backhaul that occurs when a test optical signal that can be reflected by a reflection component disposed at each port of at least one stage of optical splitter is in downlink transmission in an ODN, where reverse backhaul includes backscatter and reflection or includes backscatter.

Downlink transmission refers to a transmission direction from an OLT to an ONT. Reverse backhaul occurs when backscatter of an optical fiber exists, or occurs when backscatter and reflection of an optical fiber exist (for example, reflection occurs when an optical fiber is broken). In addition, reverse backhaul may also occur when a reflection component reflects a test optical signal.

In this embodiment, when a fault is located in the ODN, a fault locating instruction may be sent to the OTDR (for example, the OLT sends the fault locating instruction). When the OTDR receives the fault locating instruction, the OTDR may sequentially send test optical signals of wavelengths that can be reflected by the reflection component at each port of the at least one stage of optical splitter, and record sending times of sending the test optical signals of these wavelengths. When a test optical signal of any wavelength in these wavelengths passes through the ODN, a reflection component at a port that is corresponding to the wavelength and that is of the at least one stage of optical splitter in the ODN reflects (basically totally reflects) the test optical signal of the wavelength. However, the test optical signal of the wavelength is completely transmitted when passing through another port in the ODN. It may be learned that the test optical signal of the wavelength is reflected and backscattered by only various optical fibers and a specific reflection component in the ODN (generally, the optical fiber only backscatters the test optical signal, and the optical fiber also reflects the test optical signal when being broken), so that a part of the test optical signal of the wavelength returns to the OTDR through reverse backhaul and is received by the OTDR. The OTDR may record a correspondence between a receive time and receive power. In this way, a first correspondence between a receive time and receive power during reverse backhaul that occurs when a test optical signal that can be reflected by a reflection component corresponding to the wavelength is in downlink transmission in the ODN is obtained. Because a test optical signal of a wavelength that can be reflected by the reflection component at each port of the at least one stage of optical splitter needs to be sent, the first correspondence between a receive time and receive power during reverse backhaul that occurs when the test optical signal that can be reflected by the reflection component disposed at each port of the at least one stage of optical splitter is in downlink transmission in the ODN may be obtained (for ease of description in the following, this description is simplified as a description that the first correspondence corresponding to each port of the at least one stage of optical splitter is obtained).

Step 402: Determine, based on the first correspondence, a second correspondence between a transmission distance and receive power during reverse backhaul that occurs when a test optical signal is in downlink transmission in an optical fiber between each port of the at least one stage of optical splitter and a component connected to the port.

In this embodiment, the OTDR may determine, by using each first correspondence, the second correspondence between a transmission distance and receive power during reverse backhaul that occurs when a test optical signal is in downlink transmission in the optical fiber between each port of the at least one stage of optical splitter and the component connected to the port. Reverse backhaul is caused by backscatter and reflection or by backscatter. In this way, receive power generated by backscatter may alternatively be converted into an optical fiber loss, that is, the second correspondence may be a correspondence between the transmission distance and the optical fiber loss. Receive power generated after backscatter and reflection may alternatively be converted into a transmission distance and a reflection event, that is, the second correspondence may alternatively be a correspondence between the transmission distance and the reflection event.

If the at least one stage of optical splitter is an $i^{th}$-stage optical splitter (i is greater than or equal to 1), and the $i^{th}$-stage optical splitter is directly connected to the ONT, an optical fiber between each port of the $i^{th}$-stage optical splitter and a component connected to the port may be referred to as a drop optical fiber. If the at least one stage of optical splitter is an $i^{th}$-stage optical splitter, and the $i^{th}$-stage optical splitter is directly connected to an $(i+1)^{th}$-stage optical splitter, an optical fiber between each port of the $i^{th}$-stage optical splitter and the $(i+1)^{th}$-stage optical splitter connected to the port may be referred to as a distribution optical fiber.

Herein, for ease of description in the following, "a second correspondence between a transmission distance and receive power during reverse backhaul that occurs when a test optical signal is in downlink transmission in an optical fiber between each port of the at least one stage of optical splitter and a component connected to the port" is described as "a second correspondence corresponding to an optical fiber connected to each port of the at least one stage of optical splitter".

Step 403: Locate a fault in the ODN based on the second correspondence.

In this embodiment, the OTDR may determine, based on the second correspondence determined in step 402, whether a fault exists in the ODN, and determine a fault location point.

Then, the OTDR may notify operation and maintenance engineer of the fault location point in the ODN, so that the operation and maintenance engineer know fault information of the ODN in time.

In this way, a second correspondence between a transmission distance and receive power during reverse backhaul that occurs when a test optical signal is in downlink transmission in each segment of optical fiber in the ODN may be directly obtained, so that whether a fault exists in an optical fiber (a drop optical fiber, a feeder optical fiber, and a distribution optical fiber) in the ODN can be accurately determined, and a location at which the fault occurs can be accurately determined.

In a possible implementation, the at least one stage of optical splitter is a first-stage optical splitter. To be specific, the ODN includes only one stage of optical splitter, or the ODN includes a plurality of stages of optical splitters but a reflection component is disposed at each port of only the first-stage optical splitter. In step 402, processing of determining the second correspondence may be:

obtaining a third correspondence between a transmission distance in the ODN and superposed receive power of all optical fibers in the ODN: converting each first correspondence into a fourth correspondence between a transmission distance and receive power during reverse backhaul; and performing subtraction between receive power at a same transmission distance in the third correspondence and each fourth correspondence, to obtain a second correspondence between a transmission distance and receive power during reverse backhaul that occurs when a test optical signal is in downlink transmission in an optical fiber between each port of the first-stage optical splitter and a component connected to the port of the first-stage optical splitter.

In this embodiment, the OTDR may obtain the third correspondence. In the third correspondence, superposed receive power corresponding to each transmission distance is superposition of power of optical signals reflected and backscattered by all optical fibers at the transmission distance, or superposition of power of optical signals backscattered by all optical fibers at the transmission distance.

For a first correspondence corresponding to a first port of the first-stage optical splitter (the first port is any port of the first-stage optical splitter), the OTDR may determine, by using an emitting time of a test optical signal obtaining the first correspondence and the receive time in the first correspondence, a transmission time corresponding to each receive time in the first correspondence, and then determine a transmission distance by using the transmission time. The OTDR makes a correspondence between the transmission distance corresponding to each receive time and the receive power, to obtain a fourth correspondence between the transmission distance and the receive power. The OTDR may separately perform subtraction between receive power at a same transmission distance in the third correspondence and the fourth correspondence, to obtain a difference of receive power corresponding to each transmission distance in the fourth correspondence. The OTDR determines that a correspondence between the transmission distance and the difference of the receive power is a second correspondence between a transmission distance and receive power during reverse backhaul that occurs when a test optical signal is in downlink transmission in an optical fiber between the first port and a component connected to the first port. Specifically, when each transmission time is converted into a transmission distance, the following formula may be used for conversion: Transmission distance $(D)=(c*t)/2no$, where c in the formula represents a speed of light, t represents a transmission time, that is, a difference between a receive time and a sending time, and "no" represents a refractive index of an optical fiber in the ODN.

The foregoing method may be used for processing for each port of the first-stage optical splitter, to obtain the second correspondence between a transmission distance and receive power during reverse backhaul that occurs when a test optical signal is in downlink transmission in the optical fiber between each port of the first-stage optical splitter and the component connected to the port may be obtained.

Figure 5:
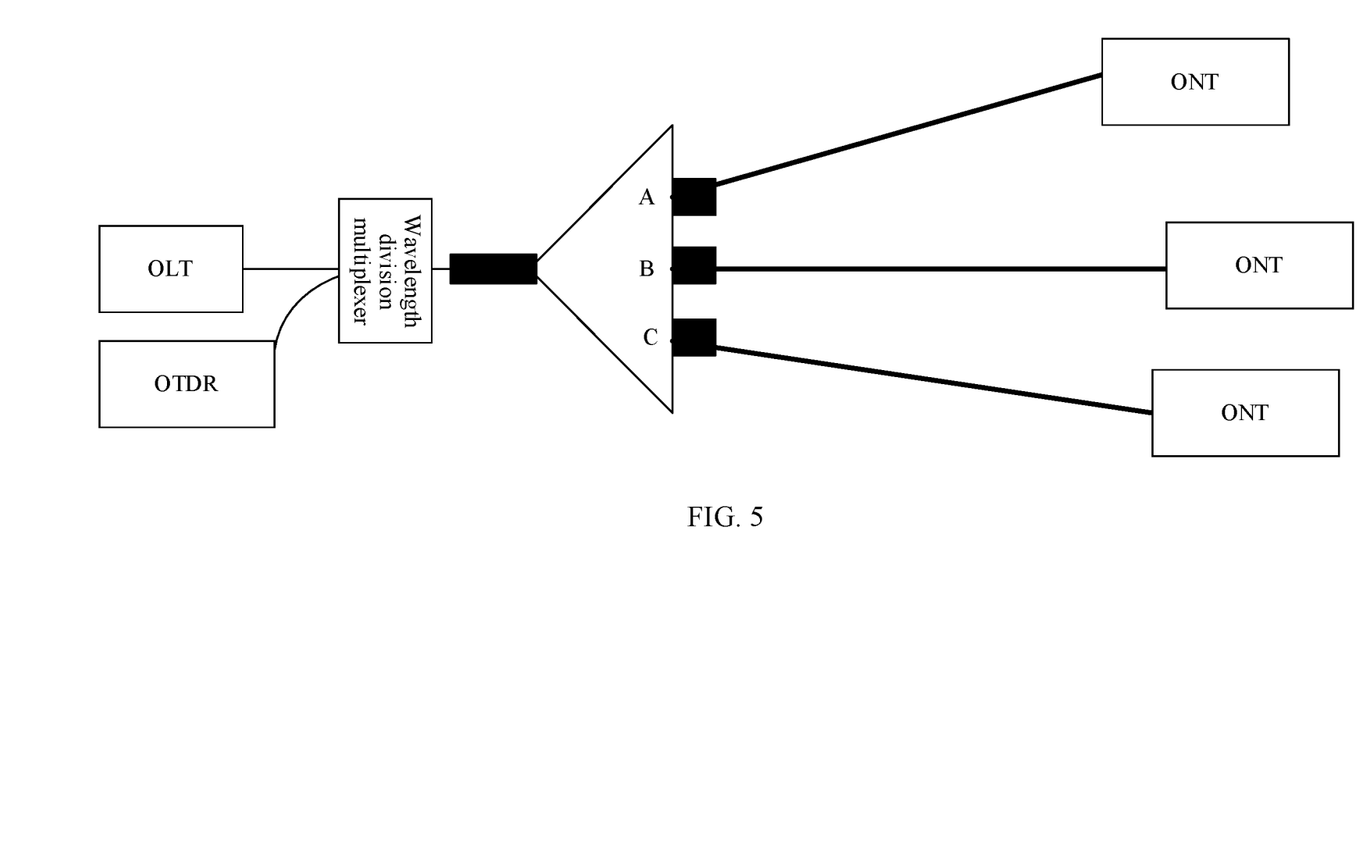
FIG. 5 is a schematic diagram of one stage of optical splitter according to an example embodiment of this application.

For example, as shown in FIG. 5, the ODN includes a first-stage optical splitter, and the first-stage optical splitter is a 1*3 optical splitter, and is connected to an ONT 1, an ONT 2, and an ONT 3. Reflection gratings disposed at three ports (a port A, a port B, and a port C) of the first-stage optical splitter respectively reflect test optical signals of $\lambda 1$, $\lambda 2$ and $\lambda 3$. The third correspondence is a correspondence between a transmission distance and superposed power for reflecting and backscattering any test optical signal by optical fibers between the ONT and the port A, the port B, and the port C, or a correspondence between a transmission distance and superposed power for backscatter. When the test optical signal of $\lambda 1$ is sent, the reflection grating at the port A reflects most of the test optical signal of $\lambda 1$, so that receive power is superposed power for reflecting and backscattering the test optical signal of $\lambda 1$ by optical fibers between the ONT and the port B and the port C, or superposed power for backscatter. When the test optical signal of $\lambda 2$ is sent, the reflection grating at the port B totally reflects the test optical signal of $\lambda 2$, so that receive power is superposed power for reflecting and backscattering the test optical signal of $\lambda 2$ by optical fibers between the ONT and the port A and the port C, or superposed power for backscatter. When the test optical signal of $\lambda 3$ is sent, the reflection grating at the port C totally reflects the test optical signal of $\lambda 3$, so that receive power is superposed power for reflecting and backscattering the test optical signal of $\lambda 3$ by optical fibers between the ONT and the port A and the port B, or superposed power for backscatter. Therefore, the superposed power for sending the test optical signal of $\lambda 1$ may be subtracted from the receive power in the third correspondence, to obtain receive power generated when an optical fiber between the port A and the ONT reflects and backscatters the test optical signal, or receive power generated during backscatter. Similarly, the superposed power for sending the test optical signal of $\lambda 2$ may be subtracted from the receive power in the third correspondence to obtain receive power generated when an optical fiber between the port B and the ONT reflects and backscatters the test optical signal, or receive power generated during backscatter. The superposed power for sending the test optical signal of $\lambda 3$ may be subtracted from the receive power in the third correspondence, to obtain receive power generated when an optical fiber between the port C and the ONT reflects and backscatters the test optical signal, or receive power generated during backscatter. It should be noted herein that, when the superposed power is subtracted from the receive power in the third correspondence, subtraction is performed between receive power at a same transmission distance.

It should be noted herein that, because the first-stage optical splitter is directly connected to the ONT, the optical fiber connected to each port of the first-stage optical splitter is a drop optical fiber.

In a possible implementation, the at least one stage of optical splitter includes a first-stage optical splitter and a second-stage optical splitter. To be specific, the ODN includes only two stages of optical splitters, or the ODN includes a plurality of stages of optical splitters but a reflection component is disposed at each port of only the first-stage optical splitter and the second-stage optical splitter. In step 402, processing of determining the second correspondence may be:

obtaining a third correspondence between a transmission distance in the ODN and superposed receive power of all optical fibers in the ODN: determining, based on the third correspondence and a first correspondence between a receive time and receive power during reverse backhaul that occurs when a test optical signal that can be reflected by a reflection component disposed at each port of the second-stage optical splitter is in downlink transmission in the ODN, a second correspondence between a transmission distance and receive power during reverse backhaul that occurs when a test optical signal is in downlink transmission in an optical fiber between each port of the second-stage optical splitter and a component connected to the port of the second-stage optical splitter; and determining, based on each first correspondence and each second correspondence, a second correspondence between a transmission distance and receive power during reverse backhaul that occurs when a test optical signal is in downlink transmission in an optical fiber between each port of the first-stage optical splitter and a component connected to the port of the first-stage optical splitter.

In this embodiment, the OTDR may obtain the third correspondence. In the third correspondence, superposed receive power corresponding to each transmission distance is superposition of power of optical signals reflected and backscattered by all optical fibers at the transmission distance, or superposition of power of optical signals backscattered by all optical fibers at the transmission distance.

For a first correspondence corresponding to a second port of the second-stage optical splitter (the second port is any port of the second-stage optical splitter), the OTDR may determine, by using an emitting time of a test optical signal obtaining the first correspondence and the receive time in the first correspondence, a transmission distance corresponding to each receive time in the first correspondence. Then, the OTDR makes a correspondence between the transmission distance corresponding to each receive time and the receive power, to obtain a fourth correspondence between the transmission distance and the receive power. The OTDR may separately perform subtraction between receive power at a same transmission distance in the third correspondence and the fourth correspondence, to obtain a difference of receive power corresponding to each transmission distance in the fourth correspondence. The OTDR determines that a correspondence between the transmission distance and the difference of the receive power is a second correspondence between a transmission distance and receive power during reverse backhaul that occurs when a test optical signal is in downlink transmission in an optical fiber between the second port and a component connected to the second port. Specifically, when each transmission time is converted into a transmission distance, the following formula may be used for conversion: Transmission distance (D)=(c*t)/2n, where c in the formula represents a speed of light, t represents a transmission time, and n represents a refractive index of an optical fiber in the ODN.

For a first port of the first-stage optical splitter (the first port is any port of the first-stage optical splitter), the OTDR may obtain a first correspondence corresponding to each port of the first-stage optical splitter, and then convert, into a transmission distance, a receive time in the first correspondence corresponding to each port, that is, convert the first correspondence into a correspondence between the transmission distance and the receive power. The OTDR may obtain second correspondences separately corresponding to optical fibers connected to all ports of the second-stage optical splitter connected to the first port.

The OTDR may determine, according to the following formula, receive power at a first transmission distance in a second correspondence corresponding to an optical fiber connected to the first port:

$$P=(1/n)*[(P11)-(n-1)*(P0)]-(P21).$$

In this formula, P11 is the sum of receive power at the first transmission distance in the first correspondence corresponding to ports other than the first port in the first-stage optical splitter: P0 is receive power at the first transmission distance in the first correspondence corresponding to the first port in the first-stage optical splitter: Pλ1 is the sum of receive power at the first transmission distance in second correspondences corresponding to optical fibers separately connected to all the ports in the second-stage optical splitter connected to the first port; and n is a quantity of ports other than the first port in the first-stage optical splitter.

In this way, the second correspondence corresponding to the optical fiber connected to the first port may be determined. This manner may be used for each port of the first-stage optical splitter, to obtain second correspondences corresponding to optical fibers connected to all the ports.

Figure 6:
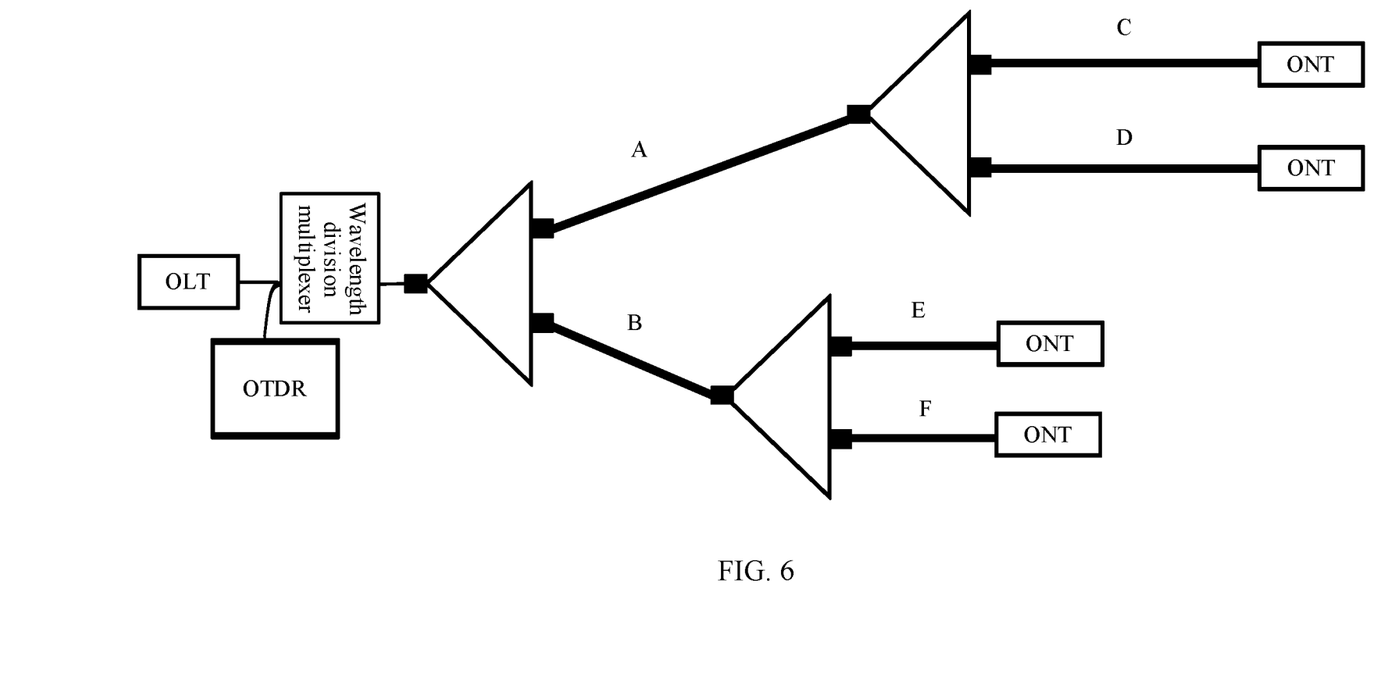
FIG. 6 is a schematic diagram of two stages of optical splitters according to an example embodiment of this application.

For example, as shown in FIG. 6, the ODN includes a first-stage optical splitter and a second-stage optical splitter. The second-stage optical splitter is connected to an ONT. The first-stage optical splitter is a 1*2 optical splitter. The second-stage optical splitter includes two 1*2 optical splitters. Reflection gratings at two ports of the first-stage optical splitter respectively reflect test optical signals of λ1 and λ2. Optical fibers connected to the two ports are respectively A and B. Reflection gratings at ports of the two 1*2 optical splitters of the second-stage optical splitter respectively reflect test optical signals of λ3, λ4, λ5, and λ6. Optical fibers connected to the ports are respectively C, D, E and F. The OTDR may sequentially send the test optical signals of λ1, λ2, λ3, λ4, λ5, and λ6, to obtain a first correspondence corresponding to each port. Receive power in a first correspondence corresponding to a port at which a reflection component of λ1 is located is superposition of B, E, and F (that is, B+E+F). Similarly, receive power in a first correspondence corresponding to a port at which a reflection component of λ2 is located is superposition of A, C, and D (that is, A+C+D). Receive power in a first correspondence corresponding to a port at which a reflection component of λ3 is located is superposition of A, B, D, E, and F (that is, A+B+D+E+F). Receive power in a first correspondence corresponding to a port at which a reflection component of λ4 is located is superposition of A, B, C, E, and F (that is, A+B+C+E+F). Receive power in a first correspondence corresponding to a port at which a reflection component of λ5 is located is superposition of A, B, C, D, and F (that is, A+B+C+D+F). Receive power in a first correspondence corresponding to a port at which a reflection component of λ6 is located is superposition of A, B, C, D, and E (that is, A+B+C+D+E). Therefore, when a second correspondence corresponding to A is determined, C and D may be subtracted from A+C+D. When a second correspondence corresponding to B is determined, E and F may be subtracted from B+E+F. When a second correspondence corresponding to C is determined, A+B+D+E+F may be subtracted from A+B+C+D+E+F. When a second correspondence corresponding to D is determined, A+B+C+E+F may be subtracted from A+B+C+D+E+F. When a second correspondence corresponding to E is determined, A+B+C+D+F may be subtracted from A+B+C+D+E+F. When a second correspondence corresponding to F is determined, A+B+C+D+E may be subtracted from A+B+C+D+E+F. The second correspondence corresponding to the optical fiber connected to each port in the ODN may be obtained in this manner. It should be noted herein that, the subtracting C and D from A+C+D is subtraction between receive power at a same transmission distance. Other cases are similar to this case, and details are not described herein again. Superposition of B, E, and F is power of a test optical signal that is received by the OTDR after the three segments of optical fibers B, E, and F separately backscatter or backscatter and reflect the test optical signal.

In a possible implementation, third correspondences that are between a transmission distance and receive power and that are corresponding to all optical fibers in the ODN may be determined in the following two manners.

Manner 1: A correspondence between a transmission distance and receive power during reverse backhaul that occurs when a test optical signal of a first wavelength is in downlink transmission in the ODN is obtained, and the correspondence is determined as a third correspondence between a transmission distance in the ODN and superposed receive power of all optical fibers in the ODN, where the first wavelength is different from a wavelength of a test optical signal that can be reflected by the reflection component at each port of the at least one stage of optical splitter.

The first wavelength is different from a wavelength of a test optical signal that can be reflected by each port of the at least one stage of optical splitter.

In this embodiment, when a fault is located in the ODN, a fault locating instruction may be sent to the OTDR. When receiving the fault locating instruction, the OTDR may send the test optical signal of the first wavelength, and record a sending time of sending the test optical signal of the first wavelength. When the test optical signal of the first wavelength passes through the ODN, all the reflection components disposed at the ports of the at least one stage of optical splitter in the ODN transmit the test optical signal of the first wavelength, and only various optical fibers and optical splitters in the ODN reflect and backscatter or backscatter the test optical signal of the first wavelength (reflection occurs at a location of a broken optical fiber or a reflection component), so that a part of the test optical signal of the first wavelength returns to the OTDR and is received by the OTDR. The OTDR may record a correspondence between a receive time and receive power, and then determine a transmission distance by using a difference between the receive time and a sending time (the transmission distance can be directly determined by using the foregoing formula, and details are not described herein), to obtain a correspondence between a transmission distance and receive power, that is, obtain the third correspondence. Because none of the reflection components in the ODN reflects the test optical signal of the first wavelength, the test optical signal of the first wavelength can pass through all the optical fibers in the ODN. Therefore, detected receive power is superposed power obtained after all the optical fibers backscatter the test optical signal of the first wavelength, or superposed power obtained after backscatter and reflection. It should be noted herein that the third correspondence may be obtained first, and then the first correspondence is determined, or the first correspondence may be determined first, and then the third correspondence is determined. This is not limited in this embodiment of this application.

Manner 2: A third correspondence between a transmission distance in the ODN and superposed receive power of all optical fibers in the ODN is determined based on a first correspondence between a receive time and receive power during reverse backhaul that occurs when a test optical signal that can be reflected by a reflection component disposed at each port of the first-stage optical splitter is in downlink transmission in the ODN.

In this embodiment, after obtaining the first correspondence corresponding to each port of the at least one stage of optical splitter, the OTDR may convert the first correspondence corresponding to each port of the first-stage optical splitter into a correspondence between a transmission distance and receive power. Afterwards, the OTDR adds up receive power at a same transmission distance in these correspondences to obtain a value, and then divides (m−1) by the value to obtain receive power at the same transmission distance. In this manner, receive power at each transmission distance is determined, and a correspondence may be made between the transmission distance and the receive power to obtain the third correspondences that are between the transmission distance and the receive power and that are corresponding to all the optical fibers in the ODN. In this way, a wavelength adjustment range of the OTDR can be reduced. In Manner 2, m is a quantity of ports of the first-stage optical splitter.

In a possible implementation, in step 403, a fault may be located in the ODN in the following manner.

If it is determined, based on a second correspondence between a transmission distance and receive power during reverse backhaul that occurs when a test optical signal is in downlink transmission in an optical fiber between a first port of the at least one stage of optical splitter and a component connected to the first port, that an abnormal location point at which receive power suddenly changes exists, the abnormal location point is determined as a fault location point of the optical fiber between the first port and the component connected to the first port.

In this embodiment, the OTDR may view; in the second correspondence corresponding to the optical fiber connected to each port of the at least one stage of optical splitter, whether an abnormal location point at which receive power suddenly changes exists. If an abnormal location point exists in a second correspondence corresponding to an optical fiber connected to a target port, it is determined that the optical fiber connected to the target port is a faulty optical fiber in the ODN, the abnormal location point may be determined as a fault location point of the optical fiber connected to the target port. In this way, not only a faulty optical fiber in the ODN is provided, but also a location point at which the optical fiber is faulty is provided.

It should be noted herein that, whether an abnormal location point at which receive power suddenly changes exists can be determined based on the second correspondence due to the following reason: Normally, when a test optical signal is transmitted in an optical fiber, receive power becomes smaller as a transmission distance becomes longer (this is described for only transmission in the optical fiber, and the receive power also becomes larger, because the test optical signal is transmitted to the ONT). However, when the optical fiber is split or broken, there is a relatively large reflectivity on the test optical signal, which causes relatively large receive power. Therefore, a fault location may be determined based on a location point at which receive power suddenly changes.

The foregoing is described by using an example in which the OTDR is the fault locating apparatus. When the OLT is used as the fault locating apparatus, the OLT may establish a communication connection to the OTDR, and obtain the first correspondence from the OTDR and a sending time corresponding to each receive time in the first correspondence. Then, the OLT performs subsequent processing based on the first correspondence, and the subsequent processing is the same as that performed by the OTDR. Details are not described herein again.

It should be noted that in this embodiment of this application, all described power is receive power. Certainly, the receive power may alternatively be converted into an optical fiber loss to locate a fault in the ODN. Specifically, a formula for conversion between the receive power and the optical fiber loss is:

optical fiber loss=10*log (receive power/1 mW), where mW represents milliwatt, and a unit of the optical fiber loss is dB.

In this embodiment of this application, a correspondence between a transmission distance and receive power during reverse backhaul that occurs when a test optical signal is in downlink transmission in each optical fiber in the ODN is obtained to accurately determine whether the optical fiber is faulty. Therefore, a fault can be more accurately located in the ODN.

Figure 7:
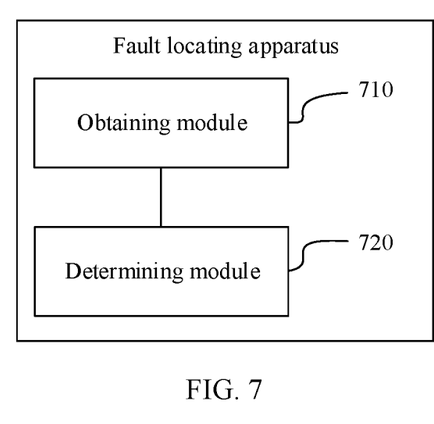
FIG. 7 is a schematic diagram of a structure of a fault locating apparatus according to an example embodiment of this application.

FIG. 7 is a diagram of a structure of a fault locating apparatus according to an embodiment of this application. The apparatus may be completely or partially implemented by using software, hardware, or a combination thereof. The apparatus is applied to a passive optical network. The passive optical network includes an ODN, and a reflection component reflecting test optical signals of different wavelengths is disposed at each port of at least one stage of optical splitter in the ODN. The apparatus provided in this embodiment of this application may implement the procedure in FIG. 4 in the embodiments of this application. The apparatus includes an obtaining module 710 and a determining module 720.

The obtaining module 710 is configured to obtain a first correspondence between a receive time and receive power during reverse backhaul that occurs when a test optical signal that can be reflected by the reflection component disposed at each port of the at least one stage of optical splitter is in downlink transmission in the ODN, where reverse backhaul includes backscatter and reflection or includes backscatter. The obtaining module 710 may be specifically configured to implement an obtaining function in step 401 and a hidden step included in step 401.

The determining module 720 is configured to: determine, based on the first correspondence, a second correspondence between a transmission distance and receive power during reverse backhaul that occurs when a test optical signal is in downlink transmission in an optical fiber between each port of the at least one stage of optical splitter and a component connected to the port; and locate a fault in the ODN based on the second correspondence. The determining module 720 may be specifically configured to implement determining functions in step 402 and step 403, and hidden steps included in step 402 and step 403.

In a possible implementation, the at least one stage of optical splitter is a first-stage optical splitter.

The determining module 720 is configured to:
obtain a third correspondence between a transmission distance in the ODN and superposed receive power of all optical fibers in the ODN;
convert each first correspondence into a fourth correspondence between a transmission distance and receive power during reverse backhaul; and
perform subtraction between receive power at a same transmission distance in the third correspondence and each fourth correspondence, to obtain a second correspondence between a transmission distance and receive power during reverse backhaul that occurs when a test optical signal is in downlink transmission in an optical fiber between each port of the first-stage optical splitter and a component connected to the port of the first-stage optical splitter.

In a possible implementation, the at least one stage of optical splitter includes a first-stage optical splitter and a second-stage optical splitter.

The determining module 720 is configured to:
obtain a third correspondence between a transmission distance in the ODN and superposed receive power of all optical fibers in the ODN;
determine, based on the third correspondence and a first correspondence between a receive time and receive power during reverse backhaul that occurs when a test optical signal that can be reflected by a reflection component disposed at each port of the second-stage optical splitter is in downlink transmission in the ODN, a second correspondence between a transmission distance and receive power during reverse backhaul that occurs when a test optical signal is in downlink transmission in an optical fiber between each port of the second-stage optical splitter and a component connected to the port of the second-stage optical splitter; and
determine, based on each first correspondence and each second correspondence, a second correspondence between a transmission distance and receive power during reverse backhaul that occurs when a test optical signal is in downlink transmission in an optical fiber between each port of the first-stage optical splitter and a component connected to the port of the first-stage optical splitter.

In a possible implementation, the determining module 720 is configured to:
obtain a correspondence between a transmission distance and receive power during reverse backhaul that occurs when a test optical signal of a first wavelength is in downlink transmission in the ODN, and determine the correspondence as a third correspondence between a transmission distance in the ODN and superposed receive power of all optical fibers in the ODN, where the first wavelength is different from a wavelength of a test optical signal that can be reflected by the reflection component at each port of the at least one stage of optical splitter; or
determine a third correspondence between a transmission distance in the ODN and superposed receive power of all optical fibers in the ODN based on a first correspondence between a receive time and receive power during reverse backhaul that occurs when a test optical signal that can be reflected by a reflection component disposed at each port of the first-stage optical splitter is in downlink transmission in the ODN.

In a possible implementation, the determining module 720 is configured to:
if it is determined, based on a second correspondence between a transmission distance and receive power during reverse backhaul that occurs when a test optical signal is in downlink transmission in an optical fiber between a target port of the at least one stage of optical splitter and a component connected to the target port, that an abnormal location point at which receive power suddenly changes exists, determine the abnormal location point as a fault location point of the optical fiber between the target port and the component connected to the target port.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

The foregoing embodiments may be completely or partially implemented by using software, hardware, firmware, or any combination thereof. When being implemented by using software, the foregoing embodiments may be completely or partially implemented in a form of a computer program product. The computer program product includes one or more computer instructions. When the computer program instructions are loaded and executed on the OLT, all or some of the procedures or functions according to the embodiments of this application are generated. The computer instructions may be stored in a computer-readable storage medium or transmitted from one computer-readable storage medium to another computer-readable storage medium. The computer-readable storage medium may be any usable medium accessible by the OLT, or a data storage device, such as a server or a data center, integrating one or more usable media. The usable medium may be a magnetic medium (such as a floppy disk, a hard disk, or a magnetic tape), or may be an optical medium (such as a digital video disk (DVD)) or a semiconductor medium (such as a solid-state disk).

What is claimed is:

1. A fault locating method, applied to a passive optical network, wherein the passive optical network comprises an optical distribution network (ODN), and a reflection component reflecting test optical signals of different wavelengths is disposed at each port of at least one stage of an optical splitter in the ODN, and the method comprises:
   transmitting, by an optical time domain reflectometer (OTDR), a test optical signal in downlink transmission in the ODN;
   detecting, by the OTDR, a part of the test optical signal that is returned to the OTDR during a reverse backhaul event, wherein the reverse backhaul event is caused by (i) backscatter or (ii) reflection and backscatter occurred in one or more optical paths, wherein the detection comprises recording a receive time and corresponding receive power;
   obtaining a first correspondence between a receive time and receive power during a first reverse backhaul event, wherein the first reverse backhaul event occurs when the test optical signal is reflected by the reflection component disposed at each port of the at least one stage of the optical splitter;
   determining, based on the first correspondence, a second correspondence between a transmission distance and receive power during a second reverse backhaul event, wherein the second reverse backhaul event occurs when the test optical signal is in downlink transmission in an optical fiber between each port of the at least one stage of the optical splitter and a component connected to the port; and
   locating a fault in the ODN based on the second correspondence.

2. The method according to claim 1, wherein the at least one stage of optical splitter is a first-stage optical splitter; and
   wherein the determining the second correspondence comprises:
   obtaining a third correspondence between a transmission distance in the ODN and superposed receive power of all optical fibers in the ODN;
   converting each first correspondence into a fourth correspondence between a transmission distance and the receive power during the first reverse backhaul event; and
   performing subtraction between receive power at a same transmission distance in the third correspondence and each fourth correspondence, to obtain the second correspondence between the transmission distance and the receive power during the second reverse backhaul event.

3. The method according to claim 1, wherein the at least one stage of the optical splitter comprises a first-stage optical splitter and a second-stage optical splitter; and
   wherein the determining the second correspondence comprises:
   obtaining a third correspondence between a transmission distance in the ODN and superposed receive power of all optical fibers in the ODN;
   determining, based on the third correspondence and the first correspondence corresponding to the test optical signal reflected by the reflection component disposed at each port of the second-stage optical splitter, the second correspondence between the transmission distance and the receive power during the second reverse backhaul event corresponding to the test optical signal in downlink transmission in the optical fiber between each port of the second-stage optical splitter and the component connected to the port of the second-stage optical splitter; and
   determining, based on each first correspondence and each second correspondence corresponding to the second-stage optical splitter, the second correspondence between the transmission distance and the receive power during the second reverse backhaul event corresponding to the test optical signal in downlink transmission in the optical fiber between each port of the first-stage optical splitter and the component connected to the port of the first-stage optical splitter.

4. The method according to claim 2, wherein the obtaining the third correspondence comprises:
   obtaining a fifth correspondence between a transmission distance and receive power during a third reverse backhaul event, wherein the third reverse backhaul event occurs when the test optical signal of a first wavelength is in downlink transmission in the ODN, and determining the fifth correspondence as the third correspondence, wherein the first wavelength is different from a wavelength of the test optical signal reflected by the reflection component at each port of the at least one stage of optical splitter.

5. The method according to claim 2, wherein the obtaining the third correspondence comprises:
   determining the third correspondence based on the first correspondence.

6. The method according to claim 1, wherein the locating the fault in the ODN based on the second correspondence comprises:
   based on determining, based on the second correspondence during the second reverse backhaul event corresponding to the test optical signal in downlink transmission in an optical fiber between a target port of the at least one stage of optical splitter and a component connected to the target port, that an abnormal location point exists where the receive power suddenly changes, further determining the abnormal location point as a fault location point of the optical fiber between the target port and the component connected to the target port.

7. A passive optical network, comprising:
   an optical time domain reflectometer (OTDR);
   an optical distribution network (ODN); and
   an optical line terminal (OLT), wherein:
   the OTDR is configured to output test optical signals of a plurality of wavelengths;
   the OTDR is further configured to:
   transmit a test optical signal of the test optical signals in downlink transmission in the ODN; and
   detect, for each test optical signal of the test optical signals, a part of the respective test optical signal that is returned to the OTDR during a reverse backhaul event, wherein the reverse backhaul event is caused by (i) backscatter or (ii) reflection and backscatter occurred in one or more optical paths, wherein the detection comprises recording a receive time and corresponding receive power;
   a reflection component reflecting the test optical signals of different wavelengths is disposed at each port of at least one stage of an optical splitter in the ODN;
   the OLT establishes a communication connection to the OTDR; and
   the OLT is configured to:
   obtain a first correspondence between a receive time and receive power during a first reverse backhaul event, wherein the first reverse backhaul event occurs when a test optical signal is reflected by the reflection component disposed at each port of the at least one stage of optical splitter;

determine, based on the first correspondence, a second correspondence between a transmission distance and receive power during a second reverse backhaul event, wherein the second reverse backhaul event occurs when a test optical signal is in downlink transmission in an optical fiber between each port of the at least one stage of optical splitter and a component connected to the port; and locate a fault in the ODN based on the second correspondence.

8. The passive optical network according to claim 7, wherein the at least one stage of the optical splitter is a first-stage optical splitter; and wherein the determining comprises:

obtaining a third correspondence between a transmission distance in the ODN and superposed receive power of all optical fibers in the ODN;

converting each first correspondence into a fourth correspondence during the first reverse backhaul event; and performing subtraction between receive power at a same transmission distance in the third correspondence and each fourth correspondence, to obtain the second correspondence between the transmission distance and the receive power during the second reverse backhaul event.

9. The passive optical network according to claim 7, wherein the at least one stage of the optical splitter comprises a first-stage optical splitter and a second-stage optical splitter; and wherein the determining the second correspondence comprises:

obtaining a third correspondence between a transmission distance in the ODN and superposed receive power of all optical fibers in the ODN;

determining, based on the third correspondence and the first correspondence corresponding to a test optical signal reflected by the reflection component disposed at each port of the second-stage optical splitter, the second correspondence between the transmission distance and the receive power during the second reverse backhaul event corresponding to a test optical signal downlink transmission in an optical fiber between each port of the second-stage optical splitter and a component connected to the port of the second-stage optical splitter; and determining, based on each first correspondence and each second correspondence corresponding to the second-stage optical splitter, the second correspondence between the transmission distance and the receive power during the second reverse backhaul event corresponding to a test optical signal in downlink transmission in the optical fiber between each port of the first-stage optical splitter and the component connected to the port of the first-stage optical splitter.

10. The passive optical network according to claim 7, wherein the obtaining the third correspondence comprises:

obtaining a fifth correspondence between a transmission distance and receive power during a third reverse backhaul event, wherein the third reverse backhaul event occurs when a test optical signal of a first wavelength is in downlink transmission in the ODN, and determining the fifth correspondence as the third correspondence, wherein the first wavelength is different from a wavelength of a test optical signal reflected by the reflection component at each port of the at least one stage of optical splitter.

11. The passive optical network according to claim 7, wherein the obtaining the third correspondence comprises:

determining the third correspondence based on the first correspondence.

12. The passive optical network according to claim 7, wherein the locating the fault in the ODN based on the second correspondence comprises:

based on determining, based on the second correspondence during the second reverse backhaul event corresponding to a test optical signal in downlink transmission in an optical fiber between a target port of the at least one stage of optical splitter and a component connected to the target port, that an abnormal location point exists where the receive power suddenly changes, further determining the abnormal location point as a fault location point of the optical fiber between the target port and the component connected to the target port.

13. A fault locating device, wherein the fault locating device comprises a processor and a memory, wherein:

the memory stores computer instructions; and the processor executes the computer instructions to implement a method comprising:

obtaining a first correspondence between a receive time and receive power during a first reverse backhaul event, wherein the first reverse backhaul event occurs when a test optical signal is reflected by a reflection component disposed at each port of at least one stage of an optical splitter, wherein the test optical signal is transmitted by an optical time domain reflectometer (OTDR) in downlink transmission in an optical distribution network (ODN), wherein the receive time and the receive power are recorded when the OTDR detects a part of the test optical signal that is returned to the OTDR during a reverse backhaul event, wherein the reverse backhaul event is caused by (i) backscatter or (ii) reflection and backscatter occurred in one or more optical paths, determining, based on the first correspondence, a second correspondence during a second reverse backhaul event, wherein the second reverse backhaul event occurs when the test optical signal is in downlink transmission in an optical fiber between each port of the at least one stage of optical splitter and a component connected to the port; and locating a fault in the ODN based on the second correspondence.

14. The fault locating device according to claim 13, wherein the at least one stage of the optical splitter is a first-stage optical splitter; and wherein the determining the second correspondence comprises:

obtaining a third correspondence between a transmission distance in the ODN and superposed receive power of all optical fibers in the ODN;

converting each first correspondence into a fourth correspondence between a transmission distance and the receive power during the first reverse backhaul event; and performing subtraction between receive power at a same transmission distance in the third correspondence and each fourth correspondence, to obtain the second correspondence between the transmission distance and the receive power during the second reverse backhaul event.

15. The fault locating device according to claim 13, wherein the at least one stage of optical splitter comprises a first-stage optical splitter and a second-stage optical splitter; and wherein the determining the second correspondence comprises:

obtaining a third correspondence between a transmission distance in the ODN and superposed receive power of all optical fibers in the ODN;

determining, based on the third correspondence and the first correspondence corresponding to the test optical signal reflected by the reflection component disposed at each port of the second-stage optical splitter, the second correspondence between the transmission distance and the receive power during the second reverse backhaul event corresponding to the test optical signal in downlink transmission in the optical fiber between each port of the second-stage optical splitter and the component connected to the port of the second-stage optical splitter; and determining, based on each first correspondence and each second correspondence corresponding to the second-stage optical splitter, the second correspondence between the transmission distance and the receive power during the second reverse backhaul event corresponding to the test optical signal in downlink transmission in the optical fiber between each port of the first-stage optical splitter and the component connected to the port of the first-stage optical splitter.

16. The fault locating device according to claim 13, wherein the obtaining the third correspondence comprises:

obtaining a fifth correspondence between a transmission distance and receive power during a third reverse backhaul event, wherein the third reverse backhaul event occurs when the test optical signal of a first wavelength is in downlink transmission in the ODN, and determining the fifth correspondence as the third correspondence, wherein the first wavelength is different from a wavelength of the test optical signal reflected by the reflection component at each port of the at least one stage of optical splitter.

17. The fault locating device according to claim 13, wherein the obtaining the third correspondence comprises:

determining the third correspondence based on the first correspondence.

18. The fault locating device according to claim 13, wherein the locating the fault in the ODN based on the second correspondence comprises:

based on determining, based on the second correspondence during the second reverse backhaul event corresponding to the test optical signal in downlink transmission in an optical fiber between a target port of the at least one stage of optical splitter and a component connected to the target port, that an abnormal location point exists where the receive power suddenly changes, further determining the abnormal location point as a fault location point of the optical fiber between the target port and the component connected to the target port.

* * * * *

UNITED STATES PATENT AND TRADEMARK OFFICE
CERTIFICATE OF CORRECTION

PATENT NO. : 12,231,162 B2
APPLICATION NO. : 17/976558
DATED : February 18, 2025
INVENTOR(S) : Dong et al.

It is certified that error appears in the above-identified patent and that said Letters Patent is hereby corrected as shown below:

In the Claims

Claim 8: Column 21, Line 17: "wherein the determining comprises:" should read as -- wherein the determining the second correspondence comprises: --.

Claim 8: Column 21, Lines 22-23: "converting each first correspondence into a fourth correspondence during the first reverse backhaul event; and" should read as -- converting each first correspondence into a fourth correspondence between a transmission distance and receive power during the first reverse backhaul event; and --.

Claim 13: Column 22, Line 40: "backscatter occurred in one or more optical paths," should read as -- backscatter occurred in one or more optical paths; --.

Claim 13: Column 22, Line 42: "correspondence during a second reverse backhaul" should read as -- correspondence between a transmission distance and receive power during a second reverse backhaul --.

Signed and Sealed this
Twenty-eighth Day of October, 2025

John A. Squires
*Director of the United States Patent and Trademark Office*